(12) United States Patent
Gräff et al.

(10) Patent No.: US 7,225,055 B2
(45) Date of Patent: May 29, 2007

(54) CONTROL DEVICE, A CONTROL MODULE, A MODULE BATTERY AND A CONTROL SYSTEM

(75) Inventors: Uwe Gräff, Ostfildern (DE); Christian Waldeck, Esslingen (DE); Heinz Hohner, Esslingen (DE)

(73) Assignee: Festo AG & Co., Esslingen (DE)

( * ) Notice: Subject to any disclaimer, the term of this patent is extended or adjusted under 35 U.S.C. 154(b) by 416 days.

(21) Appl. No.: 10/795,604

(22) Filed: Mar. 8, 2004

(65) Prior Publication Data

US 2004/0196003 A1    Oct. 7, 2004

(30) Foreign Application Priority Data

Apr. 1, 2003    (EP)    ................... 03007335

(51) Int. Cl.
*G05D 11/00*    (2006.01)
(52) U.S. Cl. ................................... 700/282
(58) Field of Classification Search ............ 700/90, 700/282
See application file for complete search history.

(56) References Cited

U.S. PATENT DOCUMENTS

| | | | |
|---|---|---|---|
| 5,519,636 A * | 5/1996 | Stoll et al. ................... | 700/282 |
| 6,298,377 B1 * | 10/2001 | Hartikainen et al. ........ | 709/223 |
| 6,427,723 B2 * | 8/2002 | Bogdanowicz et al. ..... | 137/884 |
| 2002/0017625 A1 * | 2/2002 | Rudle et al. .......... | 251/129.01 |
| 2004/0011194 A1 * | 1/2004 | Lederer et al. ............... | 92/5 R |

FOREIGN PATENT DOCUMENTS

| | | |
|---|---|---|
| DE | 10119151 A1 | 12/2002 |
| DE | 10137671 A1 | 2/2003 |
| EP | 0111871 A2 | 6/1984 |
| EP | 0964325 A1 | 12/1999 |
| JP | 07261831 | 10/1995 |
| JP | 2001282312 | 10/2001 |
| WO | WO 00/49471 * | 8/2000 |
| WO | WO 01/77534 A1 | 10/2001 |

OTHER PUBLICATIONS

European Search Report from European Application No. 03007335.7.

* cited by examiner

*Primary Examiner*—Leo Picard
*Assistant Examiner*—Chad Rapp
(74) *Attorney, Agent, or Firm*—Hoffman & Baron, LLP

(57) ABSTRACT

A control device for the control of a module battery, comprising a first external bus interface for the reception of external control commands from a higher level control and an internal bus interface for an internal bus, by way of which battery modules connected with the control device are able to be controlled in accordance with the external control command and by way of which the battery modules may transmit messages to the control device. The control device possesses a second external bus interface, by way of which visualizing data for visualizing at least one function of the module battery may be applied.

23 Claims, 3 Drawing Sheets

CONTROL DEVICE, A CONTROL MODULE, A MODULE BATTERY AND A CONTROL SYSTEM

This application claims priority based on European patent application No. 03007335.7, filed on Apr. 1, 2003.

FIELD OF THE INVENTION

The invention relates to a control device for the control of a module battery, comprising a first external bus interface for the reception of external control commands from a higher level control and an internal bus interface for an internal bus, by way of which battery modules connected with the control device, of the module battery are able to be controlled in accordance with the external control commands and by way of which the battery modules may transmit messages to the control device. The invention furthermore relates to a control module for such a control device, to a module battery, more particularly a fluid power valve battery, comprising such a control device and to a control system having such control devices.

BACKGROUND OF THE INVENTION

A control device of this type is controlled by a higher level control, as for example a memory programmed control and receives from same control commands by way of the external bus. In the case of the bus it is a question for example of a field bus or an Ethernet bus, for example an industrial Ethernet bus. The control device converts the control commands received on the external bus into local control commands and transmits such control commands to the modules of the module battery. Such modules are for example output modules, actuators, valve modules or the like. The module battery serves for example for the control of a machine, apparatus or individual tools. The means to be controlled are for example operated by fluid power, as for instance pneumatically. For this purpose pneumatic actuators for example are connected with valve modules of the module battery.

The purpose of the external bus, for example of the field bus, is a reliable and rapid transmission of control commands. In the reverse direction messages may be transmitted as well. The message are to be as compact as possible so that the bus provided for control purposes is not overloaded. Furthermore messages are for example normally compact owing to a protocol employed on the bus.

At the high level control a visualizing means, as for instance a personal computer (PC), may be connected, with which the functions of the lower level module battery or batteries may be visualized. The basis for this are for example the messages transmitted from the module battery by way of the field bus. The higher level control and/or the visualizing means must generate visualizing data in a complex manner from the messages, which have a low information content, transmitted by way of the field bus.

The generation of the visualizing data is complex. Moreover numerous operator actions are required in order to configure the generation of the visualizing data. Owing to the limited information content of the messages transferred from the module battery by way of the field bus, substantial parts of the process controlled by the module battery are frequently not able to be represented.

SUMMARY OF THE INVENTION

One object of the invention is hence to is to provide devices with which visualizing data for visualizing of one or more functions of the module battery may be provided as an output in a convenient fashion.

In the case of a control device of the type initially mentioned, for achieving this object a second external bus interface is provided by way of which the visualizing data for visualizing at least one function of the module battery may be produced as an output.

In a corresponding fashion in the case of a control module, which offers the functions of a control device of the type initially mentioned, a second mode of operation is provided, in the case of which it provides as a output, by way of a second external bus interface, the visualizing data for visualizing at least one function of the module battery. The module battery in accordance with the invention, involving for example a fluid power valve battery, is fitted with a control device in accordance with the invention and/or with one or more control modules of the invention. In the case of a control system control devices in accordance with the invention are employed.

One basic principle of the invention is to utilize different buses for different purposes. For the control purposes the choice is definitely a bus optimized for control purposes, on which the control device in accordance with the invention is connected with the first external bus interface. For visualizing data, which are employed for visualizing a function of the module battery, f. i. defective function, a graphical representation, a series of measurement data or the like, the second external bus interface is provided. The second external bus is optimized for such visualizing tasks. For instance, it provides a larger band width than the first bus.

Respectively several control devices in accordance with the invention may be connected with the first and the second bus, which are for example controlled by a common higher level control, as for instance a memory programmed control. The latter may transmit control commands in real time to the lower level control devices in accordance with the invention. The second bus, by which the control devices transmit visualizing data, is for example connected with a personal computer as an output device or a visualizing device. The visualizing data are for example transmitted as HTML data, which may appear as the output of the visualizing device using a browser.

Further advantageous developments of the invention are defined in the claims.

It is convenient for the first external bus interface to be real-time operable. Accordingly the first external bus is best in the form of a real time bus. Unlike the control commands the visualizing data may be transmitted in the one or the other case with some time delay. The second external bus interface does not need to be capable of real time operation. Conveniently, the second external bus interface is however so capable.

The second external bus interface preferably has a higher transmission rate than the first external bus interface. Accordingly, the visualizing data, which may have a larger volume, may be rapidly transmitted. This is also the aim of a second useful property of the bus interface, namely for longer messages to be able to be transmitted by way of the second external bus interface than by way of first bus interface. In a single message large amounts of visualizing data may be packed. In contradistinction to this typical control commands will be short, for which reason shorter messages suffice.

The control device preferably serves the first external bus interface with priority over the second external bus interface. Accordingly the control commands are processed with priority, whereas on the other hand visualizing data transmission, for example in the case of a high load on the control device, may if necessary take place with a time delay.

The first external bus interface is preferably a field bus interface, as for example a Profibus interface, a CANopen interface, an Interbus interface or the like. Although the internal bus of the module battery may also be a field bus, it is convenient however to use a proprietary bus, which is optimized as regards the data transmission rates, speed or the like. The second external interface is preferably in the form of a Ethernet interface, as for example an industrial Ethernet interface. Preferably the first and/or second external bus interfaces are in the form of an interchangeable bus module. Dependent on the bus module different bus protocols may be made available. For instance different bus modules may be present for the Profibus and the CANopen bus. This measure renders possible simple adaptation to the respective process control environment, that is to say for example to the bus protocol utilized for the higher level control.

The visualizing data are preferably completely or partly formed on the basis of the messages transmitted by the battery modules. Visualizing data, in the case of which the messages of the battery module are not necessary, may for example be protocol-copied or recorded control commands, parameterizations or the like.

The visualizing data preferably have a format able to be represented using an Internet browser. They may for example be encoded in hypertext markup language (HTML). It is in this manner that a conventional personal computer may be employed for the display of the visualizing data.

The battery modules are preferably interchangeable. In the case of the battery modules it is for example a question of fluid power valve modules, as for example pneumatic valve modules, input-output modules, actuator modules, sensor modules or the like.

The control device preferably comprises a storage programmed control (SPS) for the control of the battery modules. Accordingly it is characterized by high degree of reliability.

Preferably an operator device interface is provided for the connection of a local operating and/or visualizing device. By way of such local interface a local operating/visualizing device is more particularly connected. The operating/visualizing is a definitely preferred choice locally associated with the control device in accordance with the invention. On the contrary several control devices in accordance with the invention and/or visualizing devices (for instance a plurality of PCs), also in accordance with the invention, may be connected with the second bus, by way of which output of the visualizing data takes place.

The battery modules are preferably interchangeable. It is an advantage however for them to constitute an integral component of the control device. Accordingly a compact structural unit is formed which comprises the battery modules and the control device.

The second bus interface is preferably able to be parameterized to provide first and second visualizing data. An operator may for example set it to determine what type of visualizing data are to be offered to the bus interface. For instance it is possible to determine whether data are to be displayed as a table and/or as a graphic function.

The further measures render possible an optimized modular concept, in which the control device comprises two or more control modules. Each control module is then allotted an individual function or its own.

The control device preferably comprises a first and a second control module of the same type. The first control module provides the control function for the control of the battery module by way of the internal bus. The second control module serves to provide the visualizing data for the second bus interface. The second external bus interface is preferably arranged on the second control module. The first control module advantageously provides the second control module with the raw data necessary for the generation of the visualizing data. It is however also possible for the second control module to record data traffic transmitted along the internal bus, as for example messages from the battery modules, and on the basis of such information to generate the visualizing data and provide same at the second bus interface.

A control module in accordance with the invention is preferably designed for selectively providing the control function for the control of the battery modules by way of the internal bus or providing the visualizing data for the second external bus interface. The first and the second mode of operation are preferably able to be set. For this purpose an operational mode switch may be provided. It is however posible as well for the control module itself to find its mode of operation, and as it were, have an auto-detect function. For instance the control module operating as a second control module may (by dint of a plug connector or the like connected with the second external bus interface) detect that it is to serve as a visualizing module.

It is an advantage for a control module in accordance with the invention to be able to be set in a third mode of operation, in the case of which by way of the bus interface it can receive control commands from a higher level control. In the case of this third mode of operation and of a control device in accordance with the invention the first external bus interface (for example a field bus interface) may be omitted. The control module is accordingly universally applicable. It may operate without any higher level control as a field bus slave (for which purpose a special field bus module may be present), as a controlled module (controlled by way of an Ethernet) and as a visualizing/monitoring module operated in accordance with the invention which provides the visualizing data The control module in accordance with the invention preferably also includes first bus interface, as for example a field bus interface. It is also possible however for a separate bus module to be present for this.

Further advantageous developments and convenient forms of the invention will be understood from the following detailed descriptive disclosure of one embodiment thereof in conjunction with the accompanying drawings.

DESCRIPTION OF THE PREFERRED EMBODIMENTS

Figure 1:
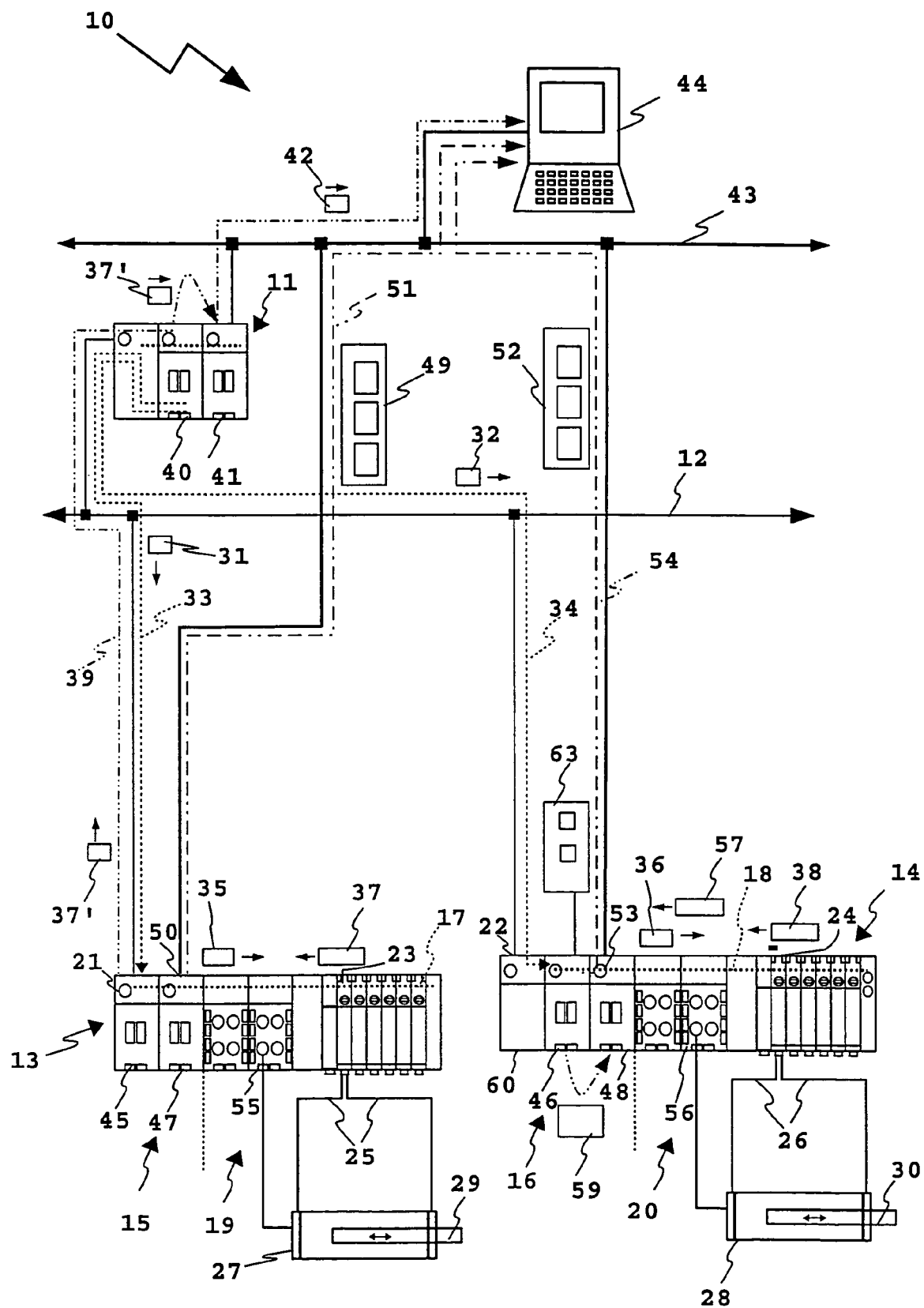
FIG. 1 shows the control system of the invention including control devices in accordance with the invention, a higher level control and a visualizing device.

In the case of a control system 10 a higher level control 11, for example in the form of a storage programmed control (SPS), controls module batteries 13 and 14 by way of a first external bus 12, as for example a field bus. The bus 12 is provided for control tasks, i. e. it is, for example adapted for real time operation.

Control devices 15 and 16 of the module batteries 13 and 14 form control commands, received from the high level control 11, local control commands and transmit same by way of internal buses 17 and 18 to battery modules 19 and 20 of the module batteries 13 and 14. The control devices 15 and 16 and the battery modules 19 and, respectively, 20 are placed in a row and in all constitute the module batteries 13 and 14. For instance in the case of the battery modules 19 and 20 it is a question of sensor modules, diagnostic modules, actuator modules or, preferably, of valve modules. For instance valve modules 23 and 24 control fluid power actuators, as for example pneumatic cylinders 27 and 28, by way of fluid lines 25 and 26. In a manner dependent on such control means the valve members 29 and 30 of the cylinders 27 and 28 are reciprocated.

For instance the higher level control 11 transmits control commands 31 and 32 to the control devices 15 and 16 by way of bus connections 33 and 34, which are present on the first external bus, a sort of control bus, between the higher level control 11 and the module batteries 13 and 14. The control devices 15 and 16 generate internal control commands 35 and 36 from the external control commands 31 and 32, and such internal control commands are passed by same by way of the two internal buses 17 and 18 to the valve modules 23 and 24. The valve modules 23 and 24 control the pneumatic actuators, the cylinders 27 and 28, in accordance with the control commands 35 and 36, the valve members 29 and 30 being for example extended or retracted.

In the monitoring means the valve modules 23 and 24, which for example comprise electrically operated pneumatic pilot valves, send messages 37 and 38 indicating that the control commands 35 and 36 have been effected.

On the basis of the message 37 in the following firstly a known message processing method will be described in detail. The control device 15 generates a message 37' on the basis of the message 37, the message 37' having a reduced information content as compared with the originally detailed message 37 with a large information content. Thus the bus 12 provided as such for control purposes has a relatively low load. A control module 40 provided for the control of the module batteries 13 and 14, of the higher level control 11 transmits the message 37' to a visualizing module 41. From the message 37' the visualizing module 41 generates visualizing data 42. The visualizing data 42 have a more extensive information content in comparison with the message 37'. For instance the message 37' is graphically processed. The processing of the visualizing data 42 by the visualizing module 41 is able to be programmed by an operator, for which purpose, however, a substantial amount of programming work is necessary.

The visualizing module 41 sends the visualizing data 42, in the case of which for example it is a question of HTML data, by way of a second external bus 43 to a visualizing device 44. The bus 43 is for example constituted by a local network, as for example a local area network (LAN) or by the Internet. The visualizing device 44 is for example a personal computer, with a browser which is able to represent the visualizing data 42. It is possible however as well for a customized visualizing program of the visualizing device to be necessary for representation of the visualizing data 42. Similarly as with the message 37 the control device 15 may transmit further information of the module battery 13 to the higher level control and accordingly to the visualizing data 42, as for example data series or the like. In this respect the limited transmission capacity of the bus 12 is to be taken into account. Therefore in the message or, respectively, monitoring direction the information flow is complex in the prior art and may even lead to bottle necks.

In this respect the invention provides a remedy in the following manner:

In addition to the control modules 45 and 46, which serve for the conversion or effecting of the control commands of the higher level control 11, the control devices 15 and 16, contain further control modules 47 and 48, which in the following will be termed visualizing modules 47 and 48.

At the visualizing device 44 the visualizing modules 47 and 48 provide visualizing data for visualizing one or more functions of the module batteries 13 and 14. For instance, it is here a question of measurement data series, graphical representations, error protocols, statistics, electronic labels of the battery modules 19 and 20, diagnosis histories, configuration parameters or other configuration data and the like. In any case the visualizing data contain a relatively large data volume and are comfortably processed by the visualizing modules 47 and 48 so that they may be represented at the visualizing device 44 without much complexity, for example just with the aid of an Internet browser.

The visualizing data produced by the visualizing modules 47 and 48 have a comparatively large data volume. Accordingly the second external bus 43 is designed for such data quantities. For instance it may be a question of an Ethernet bus, on which data may be transferred with the aid of an Internet protocol, f. i. the transport control protocol/Internet protocol (TCP/IP). Using such protocols messages may be generated with a dynamic length. Thus for example for visualizing data, which have a large volume, longer messages may be formed and transmitted if necessary.

The visualizing module 47 transmits visualizing data 49 by way of an external bus interface 50 on a bus connection 51 to the visualizing device 44. In a similar fashion the visualizing module 48 sends visualizing data 52 by way of an external bus interface 53 on a bus connection 54 on the bus 43 to the visualizing device 44.

The visualizing data 49 and 52 are generated in different manners.

The visualizing module 50 of the control device 15 traces or receives messages transmitted by the battery modules 19 on the internal bus 17, as for example the message 37. Furthermore a monitoring module 55 of the module battery 13 sends position data, temperature data or the like relating to the pneumatic cylinder 27 to the visualizing module 47. Messages sent by way of the internal bus 17 may be explicitly addressed to the visualizing module 47, as for example with the aid of its bus address. It is however also possible for the visualizing module 50 to receive message on the bus 17, which are directed for example to the control module 45 or some other module of the module battery 13. On the basis of the information transmitted on the bus 17 the visualizing module 47 forms the visualizing data 49.

In contradistinction to the control device 15 in the case of the control device 16 an alternative approach is adopted for visualizing. In the case of the control device 16 the raw data necessary for the visualizing data 52 are provided by the control module 46. Information, as for example the message 38 and furthermore by messages 57 transmitted by a monitoring module 56 functionally similar to the monitoring module 55 on the internal bus 18, is pre-processed by the control module 46. Such information is provided by the control module 46 with, for example, a time stamp and by the control module is entered into a data base 58. From time to time the visualizing module 48 interrogates the control module 46 to get raw data 49, which are generated from the content of the data base 58. It is possible however as well for the control module 46 to spontaneously transmit such raw data 59 to the visualizing module 48 at regular intervals and/or on the occurrence of predetermined events, as for example on there being a change of at least one value in the data base 58.

The visualizing module 48 could for example also be termed a Web server. From the raw data 59 it generates the visualizing data 52, for example in a format to be represented by an Internet browser, f. i. as HTML data, as JAVA scripts or the like. In any case the visualizing data 52 are readily able to be represented at the visualizing device 44. For instance for the interrogation of the visualizing data 52 at the visualizing device 44 only one address, for example the Internet address, of the module battery 14 is entered. The visualizing module 48 then provides the visualizing device 44 with an operator interface, at which the visualizing data 52 may be interrogated. For instance measurement series, temperature characteristics, pressure fluctuation data in the fluid lines 26 or the like may be obtained by such interrogation.

Figure 2:
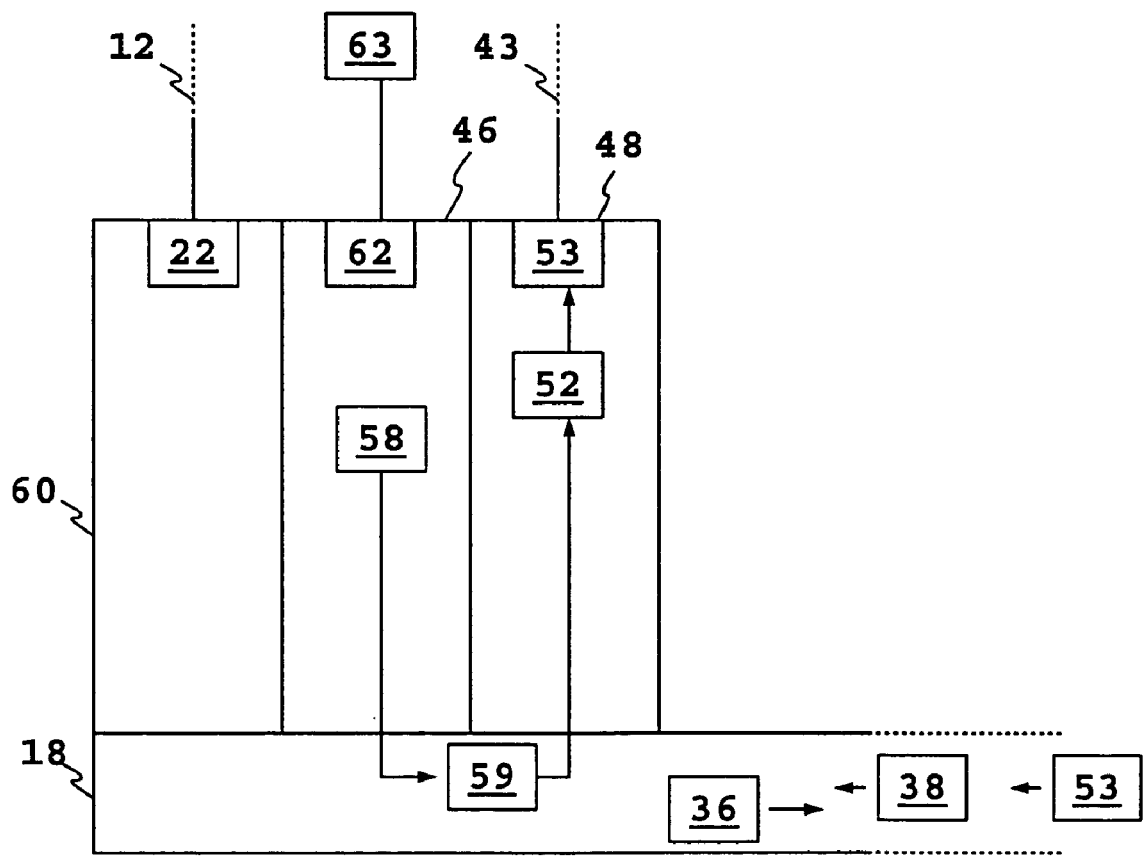
FIG. 2 is a diagrammatic functional view of a control device in accordance with FIG. 1.

In FIG. 2 the control device 16 is represented functionally. The control device 16 comprises, in addition to the control modules 46 and 48, a bus module 60 with the first external bus interface 22 for the external bus 12. This constitutes a departure from the control device 15, in the case of which the control module 45 comprises the bus interface 21 for the bus 12. In any case the bus module 60 allows for simple adaptation to different bus protocols or the like. The bus module 60 serve as a connecting link between the control module 46 and the bus 12. The modules 60, 46 and 48 communicate with one another by way of the internal bus 18. For example the control module 46 transmits the raw data 59 by way of internal bus 18 to the visualizing module 48.

The control module 46 possesses an operator device interface 62, with which in the working example a local operator and/or visualizing device 63 is connected. Using the operator device 63 it is possible, f. i., for threshold values to be parameterized or data may be interrogated from the control module 46, for example measurement data.

Figure 3:
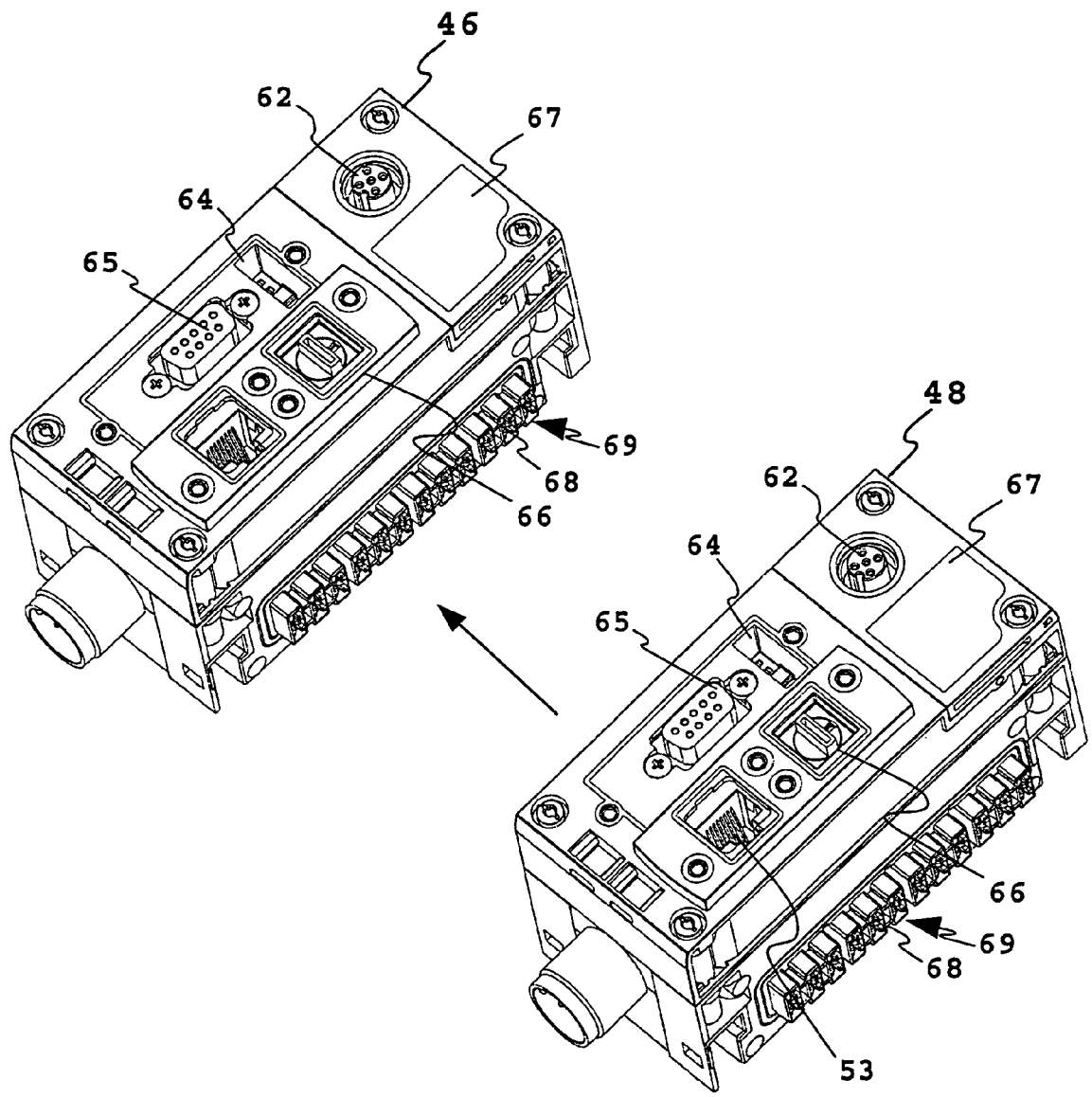
FIG. 3 shows control modules in accordance with the invention of the control device as in FIG. 2 for the control of a module battery and for providing visualizing data in a view looking obliquely downward.

The control modules 46 and 48 are in the present case modules of the same type and for instance possess a microprocessor, memories and furthermore input or output interfaces. The control modules 46 and 48 may be directly placed in a row or series adjacent to each other. On the basis of the operator and connection elements illustrated in FIG. 3 in the following the individual manners of functioning of the control modules 46 and 48 will be described in detail.

With the aid of a mode of operation switch 64 the respective mode of operation of the control modules 46 and 48 may be set. For instance in the case of the control module 46 the function for the control of the battery modules 20 is set, while in the case of the control or respectively visualizing module 48 the function is set as a visualizing module.

By way of the programming interface 65 the control modules 46 and 48 may be programmed. To take an example, operating systems, function programs or the like may be loaded in a flash memory of the modules 46 and 48. User friendly programs, as for example programs loaded by way of the programming interface 65, may be activated or halted using a switch 64.

The external bus interface 53 is in the present case designed with the aid of an RJ45 plug. The interfaces 53, 63 and 65 are preferably designed with a superior type of security, f. i. IP 67. This renders possible the use of the control device 16 in problematical environmental conditions, for example in moist and/or dirty surroundings. With the aid of a display means 67, which for example comprises LEDs, functions and/or states of the control module 46 and 48 and/or the module battery 14 may be indicated.

The interfaces 53, 52 and 65 and also the display means 67 are located of the top side of the control modules 46 and 48. Multiple plugs 68, arranged at the opposite sides of the control modules 46 and 48, serve to form the internal bus 18 is formed. The modules 46 and 48 and the further battery modules 20 of the module battery 14 also possess multiple plugs of the same type as the multiple plug 68 and are connected by means of this multiple plugs. The multiple plug 68 constitutes an internal bus interface 69.

What is claimed is:

1. A control device for the control of a module battery comprising a first external bus interface for the reception of external control commands from a higher level control and an internal bus interface for an internal bus, by way of which battery modules, connected with the control device, of the module battery are able to be controlled in accordance with the external control commands and by way of which the battery modules are adapted to transmit messages to the control device, wherein a second external bus interface is provided by way of which visualizing data for visualizing at least one function of the module battery is adapted to be produced as an output.

2. The control device as set forth in claim 1, wherein the first external bus interface is capable of real time operation.

3. The control device as set forth in claim 1, wherein the second external bus interface is adapted for a higher data transmission rate than the first external bus interface and/or by way of the second external bus interface longer messages are adapted to be transmitted than by way of the first external bus interface.

4. The control device as set forth in claim 1, wherein the first external bus interface is served with a priority over the second external bus interface.

5. The control device as set forth in claim 1, wherein the first external bus interface is a field bus interface and/or the second external interface is an Ethernet interface.

6. The control device as set forth in claim 1, wherein the first and/or the second external bus interface is designed in the form of an interchangeable bus module adapted to provide an interface in accordance with at least one of a plurality of bus protocols.

7. The control device as set forth in claim 1, wherein the visualizing data are constituted at least partially by messages transmitted by the battery modules.

8. The control device as set forth in claim 1, wherein the visualizing data have a format able to be displayed by an Internet browser.

9. The control device as set forth in claim 1, wherein the more particularly interchangeable battery modules comprise at least one fluid power valve module and/or an input/output module and/or an input module and/or an output module.

10. The control device as set forth in claim 1, comprising a memory programmable control for the control of the battery modules.

11. The control device as set forth in claim 1, comprising an operator device interface for the connection of a local operator and/or visualizing device.

12. The control device as set forth in claim 1, wherein the battery modules constitute an integral component of the control device.

13. The control device as set forth in claim 1, wherein the second bus interface is able to be parameterized for the provision of first or second visualizing data.

14. The control device as set forth in claim 1, wherein the module battery comprises the control device and the battery modules, the control device and the battery modules being disposed in a row.

15. A control device for the control of a module battery comprising a first external bus interface for the reception of external control commands from a higher level control and an internal bus interface for an internal bus, by way of which battery modules, connected with the control device, of the module battery are able to be controlled in accordance with the external control commands and by way of which the battery modules are adapted to transmit messages to the control device, wherein a second external bus interface is provided by way of which visualizing data for visualizing at least one function of the module battery is adapted to be produced as an output further comprising a first and a second control module of a same type, the first control module being adapted to provide the control function for the control of the battery modules by way of the internal bus and the second control module being adapted for the provision of the visualizing data for the second external bus interface.

16. The control device as set forth in claim 15, wherein the first control module is adapted to provide raw data to the second control module for generation of the visualizing data.

17. A control module for a control device, the control device controlling a module battery, the control device comprising a first external bus interface for the reception of external control commands from a higher level control and an internal bus interface for an internal bus, by way of which battery modules, connected with the control device, of the module battery are able to be controlled in accordance with the external control commands and by way of which the battery modules are adapted to transmit messages to the control device, wherein a second external bus interface is provided by way of which visualizing data for visualizing at least one function of the module battery is adapted to be produced as an output, the control device comprising a first and a second control module of a same type, the first control module being adapted to provide the control function for the control of the battery modules by way of the internal bus and the second control module being adapted for the provision of the visualizing data for the second external bus interface, the control module being designed for selectively providing the control function for the control of the battery modules by way of the internal bus and for providing the visualizing data for the second external bus interface and said control device is adapted to be set in a first mode of operation as a first control module or a second mode of operation as a second control module.

18. The control module as set forth in claim 17, able to be set for a third mode of operation in which it is adapted to receive, by way of the second bus interface, control commands of a higher level control.

19. The control module as set forth in claim 17, comprising the first external bus interface.

20. A module battery and more particularly a fluid power valve battery comprising at least one control device and/or at least one control module, the control device controlling a module battery, the control device comprising a first external bus interface for the reception of external control commands from a higher level control and an internal bus interface for an internal bus, by way of which battery modules, connected with the control device, of the module battery are able to be controlled in accordance with the external control commands and by way of which the battery modules are adapted to transmit messages to the control device, wherein a second external bus interface is provided by way of which visualizing data for visualizing at least one function of the module battery is adapted to be produced as an output, the control module being designed for selectively providing the control function for the control of the battery modules by way of the internal bus and for providing visualizing data for the second external bus interface and said control device is adapted to be set in a first mode of operation as a first control module or a second mode of operation as a second control module.

21. The battery module as set forth in claim 20, wherein the module battery comprises the control device and the battery modules, the control device and the battery modules being disposed in a row.

22. A control system comprising a first external bus with a higher level control for the control of at least two control devices by way of the first external bus, at least one of the control devices controlling a module battery, at least one of the control devices comprising a first external bus interface for the reception of external control commands from a higher level control and an internal bus interface for an internal bus, by way of which battery modules, connected with the control device, of the module battery are able to be controlled in accordance with the external control commands and by way of which the battery modules are adapted to transmit messages to the control device, wherein a second external bus interface is provided by way of which visualizing data for visualizing at least one function of the module battery is adapted to be produced as an output, and a second bus for the connection of a visualizing device at which visualizing data provided by the control devices may be displayed.

23. The control system as set forth in claim 22, wherein the module battery comprises the control device and the battery modules, the control device and the battery modules being disposed in a row.

* * * * *